T. H. THOMAS.
AUTOMATIC SPEED CONTROL DEVICE.
APPLICATION FILED MAY 12, 1920.
1,381,947. Patented June 21, 1921.
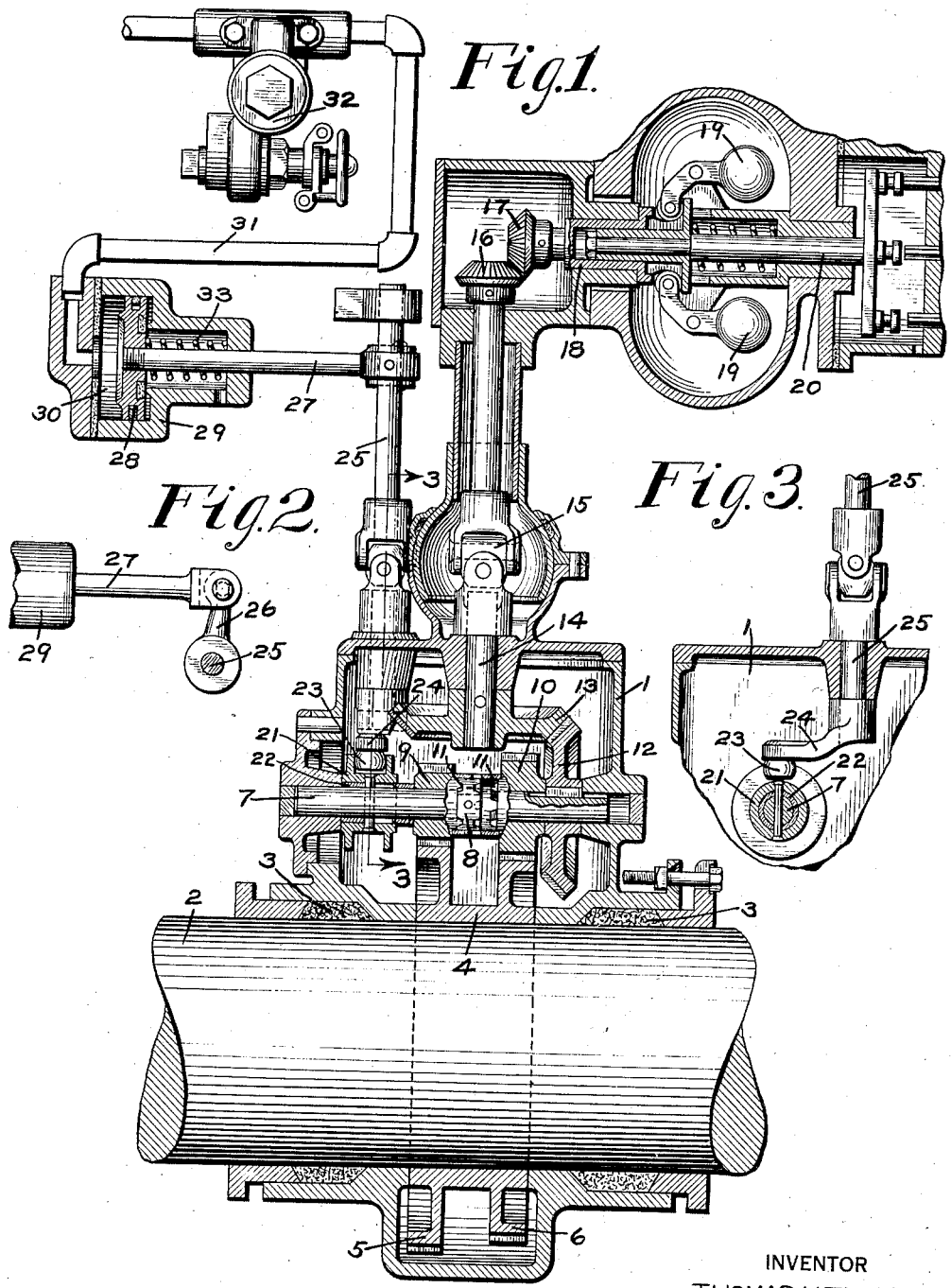
INVENTOR
THOMAS H. THOMAS
BY *Wm. N. Cady*
ATTORNEY

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC SPEED-CONTROL DEVICE.

1,381,947.  Specification of Letters Patent.  Patented June 21, 1921.

Application filed May 12, 1920. Serial No. 380,899.

*To all whom it may concern:*

Be it known that I, THOMAS H. THOMAS, a citizen of the United States, residing at Edgewood, in the county of Allegheny and State of Pennsylvania, have invented new and useful Improvements in Automatic Speed-Control Devices, of which the following is a specification.

This invention relates to automatic train speed controlling devices.

It has heretofore been proposed to provide a train speed control device having a centrifugal or other speed controlled governor operatively connected to the axle of the locomotive so as to rotate in accordance with the speed of the train and means controlled by the governor for regulating the speed of the train according to the signal indication in advance of the train.

With a device of the above character, the train is controlled within a certain speed range, such as high speed, low speed and an intermediate speed limit, but it will be evident that the speed range adapted for passenger service will be different from the speed range for freight service.

In some instances, the same locomotives are at times used in both classes of service and if equipped with a speed control apparatus, it will be apparent that the speed control apparatus must be adjusted for the range of speed suitable for the service in which it is operating.

The principal object of my invention is to provide a speed control device having means for adjusting the device for different speed ranges according to the class of service.

In the accompanying drawing; Figure 1 is a sectional view of a train speed control apparatus embodying my invention; Fig. 2 a plan view, in part, of the piston mechanism operated by feed valve pressure; and Fig. 3 a partial section on the line 3—3 of Fig. 1.

According to my invention, I preferably utilize the condition that in passenger service a higher standard brake pipe pressure is employed than in freight service, so that in passenger service the feed valve device for maintaining the pressure in the brake pipe is set for a higher pressure than in freight service.

For this purpose I provide a mechanism for changing the gear ratio between the driving axle of the locomotive and the speed controlled governor and means controlled by feed valve pressure for operating said mechanism.

As shown in the drawing, the construction may comprise a gear casing 1, mounted on the driving axle 2 of the locomotive and having packing rings 3 for preventing leakage of oil from the gear case.

Secured to the axle 2 is a gear member 4 provided with two spur gears 5 and 6 of different diameters and mounted in the gear case in alinement with the axle 2 is a shaft 7 having secured thereto a clutch member 8 and adapted to be shifted longitudinally.

Rotatably mounted on the shaft 7 are pinions 9 and 10 meshing with the gears 5 and 6 respectively and the inner face of each pinion is provided with teeth 11 adapted to be engaged by corresponding teeth of the clutch member 8.

Keyed to the shaft 7 but adapted to permit sliding movement of the shaft is a bevel gear 12 meshing with a bevel gear 13 secured to a vertical shaft 14. A universal joint 15 may be interposed in the shaft 14 to allow for variations in alinement of the parts.

To the outer end of the shaft 14 is secured a bevel pinion 16 meshing with a bevel pinion 17 secured to a horizontal shaft 18. The shaft 18 is connected to centrifugal governor balls 19 and the governor is adapted to operate a shaft 20, the movement of which operates valves or other means by which the speed of the train is controlled, such for example, as that shown in Patent No. 1,316,205 of W. V. Turner, dated September 16, 1919.

For shifting the shaft 7 an annularly grooved member 21 is secured to the shaft and has a bearing on a sleeve 22 carried by the shaft 7. A roller 23 carried by an arm 24 engages in the groove of said member 21 and the arm 24 is secured to the lower end of a vertical shaft 25. Secured to the shaft 25 is an arm 26, pivotally connected to a piston rod 27 of a piston 28 contained in a piston cylinder 29.

The piston chamber 30 of said piston is connected by pipe 31 to a feed valve device 32 which is of the usual type for supplying fluid under pressure to and maintaining the pressure in the brake pipe of the fluid pressure brake system according to the adjustment of the feed valve device.

In operation, if the feed valve device 32 is adjusted for high pressure, such as used in passenger service, the pressure of fluid supplied to the piston chamber 30 will be sufficient to overcome the resistance of spring 33 and cause the movement of piston 28 to the position shown in Fig. 1. The grooved member 21 is therefore in position for holding the shaft 7 and the clutch member 8 so that the clutch member engages the teeth 11 of the pinion 9. The pinion 9 is thus locked to the shaft 7, so that the gear 5 of greater diameter is operated to drive the shaft 7 through the pinion 9 and thereby the bevel gears 12 and 13. The governor device will therefore be rotated at a relative speed for securing the range of speeds required in passenger service.

If the feed valve device 32 is set for low pressure as employed in freight service, the fluid pressure supplied to the piston chamber 30 will be less than the pressure exerted by spring 33, so that the piston 28 will be shifted by the spring to its outer seat and the shaft 25 will be rotated to shift the grooved member 21 and the shaft 7 to the right. The clutch member 8 will then engage the teeth 11 of the pinion 10, so that the pinion 10 will be locked to the shaft 7 and the bevel gears 12 and 13 will be rotated at a relative speed corresponding with the ratio of the gears 6 and 10.

It will thus be seen that the speed control apparatus is automatically adjusted for freight or passenger service without attention on the part of the engineer by the changing of the feed valve adjustment so as to supply fluid under pressure to the brake pipe at the pressure desired for the class of service the locomotive is to be employed in.

Having now described my invention, what I claim as new and desire to secure by Letters Patent, is:—

1. In a train speed control apparatus, the combination with a train speed controlled governor device for controlling the speed of the train, of mechanism adapted to be adjusted for rotating said governor device at different rotative speeds relative to the speed of the train and fluid pressure operated means for adjusting said mechanism.

2. In a train speed control apparatus, the combination with a train speed controlled governor device for controlling the speed of the train, of mechanism adapted to be adjusted for rotating said governor device at different rotative speeds relative to the speed of the train and fluid pressure operated means controlled according to the pressure of fluid supplied thereto for adjusting said mechanism.

3. In a train speed control apparatus, the combination with a train speed controlled governor device for controlling the speed of the train, of a gear mechanism for driving said governor device at a speed relative to the speed of the train, means for changing the gear ratio of said gear mechanism so as to vary the relative speed of the governor device, and mechanism controlled by fluid under pressure for operating said means.

4. In a train speed control apparatus, the combination with a train speed controlled governor device for controlling the speed of the train, of a feed valve device adapted to be adjusted for changing the degree of pressure maintained in the fluid pressure brake system and means governed according to the pressure of fluid supplied by said feed valve device for varying the speed of the governor device relative to the speed of the train.

5. In a train speed control apparatus, the combination with a train speed controlled governor device for controlling the speed of the train, of a locomotive axle, trains of gears driven by said axle for operating said governor device at different speeds relative to the speed of the train, means for operatively connecting the different trains of gears to the governor device, a feed valve device for supplying fluid at different degrees of pressure, and mechanism operated according to the pressure of fluid supplied by the feed valve device for operating said means.

In testimony whereof I have hereunto set my hand.

THOMAS H. THOMAS.